June 27, 1933.   A. KLIMIS ET AL   1,915,791
AUTOMATIC PHOTOGRAPHIC APPARATUS
Filed April 20, 1929   6 Sheets-Sheet 2
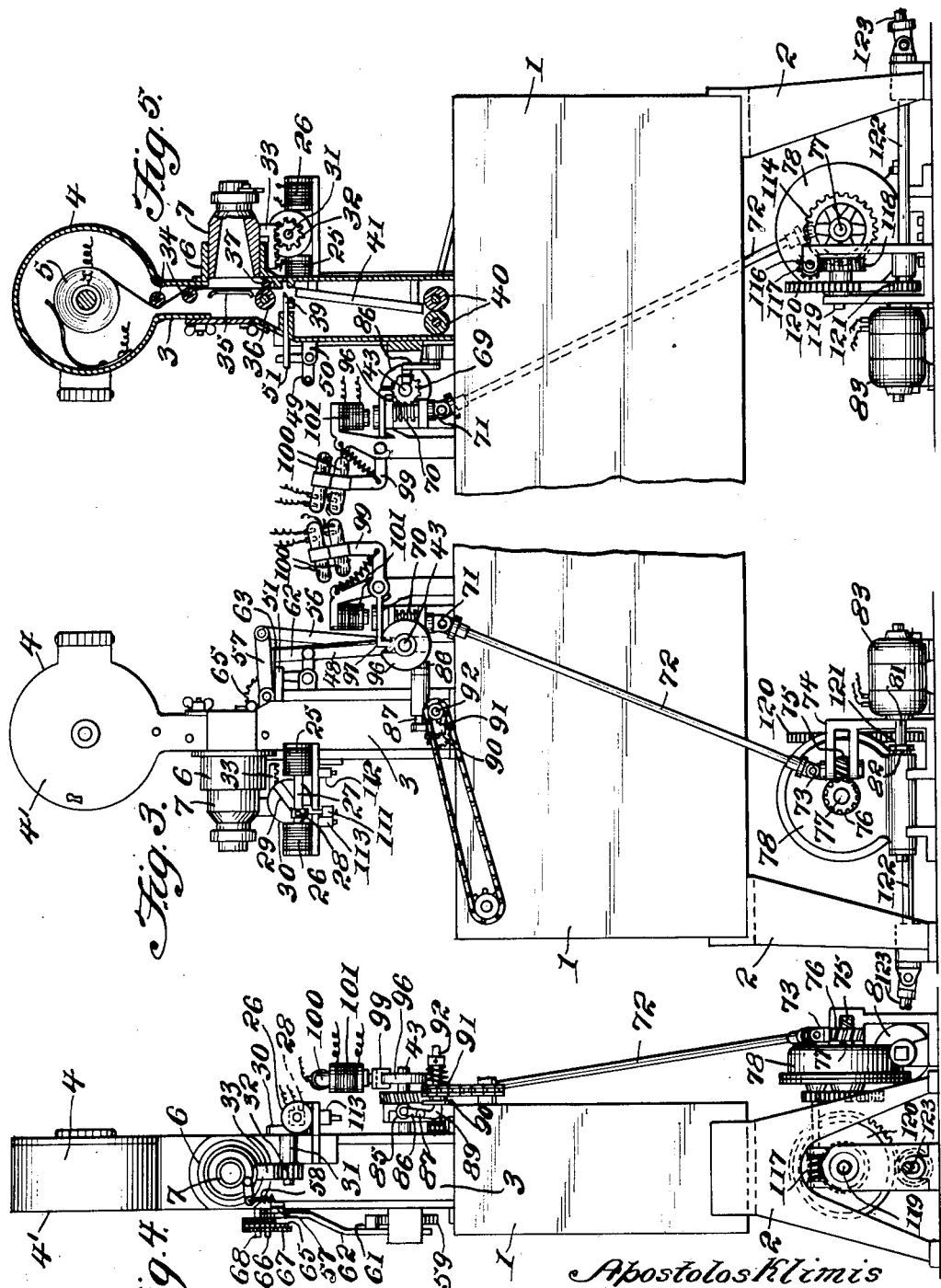
Apostolos Klimis
James Feola INVENTORS
BY Victor J. Evans & Co.
ATTORNEY

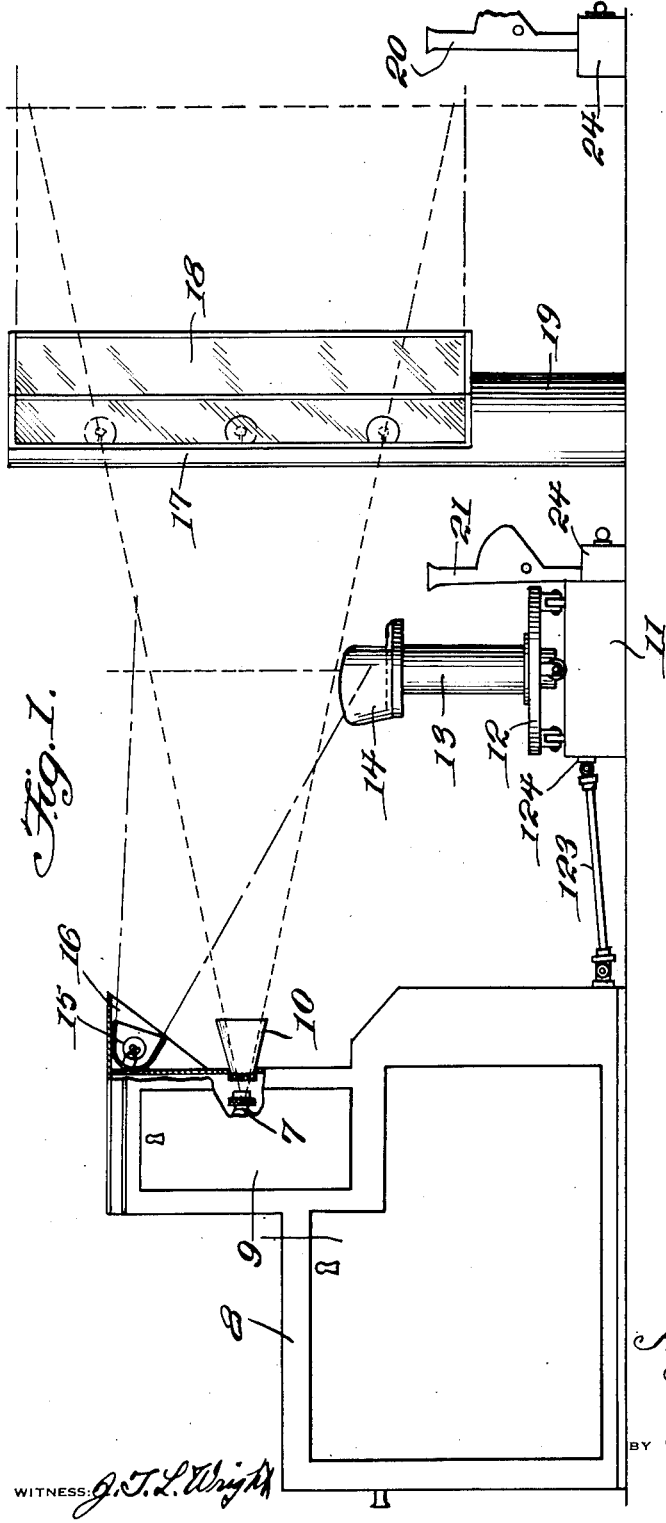

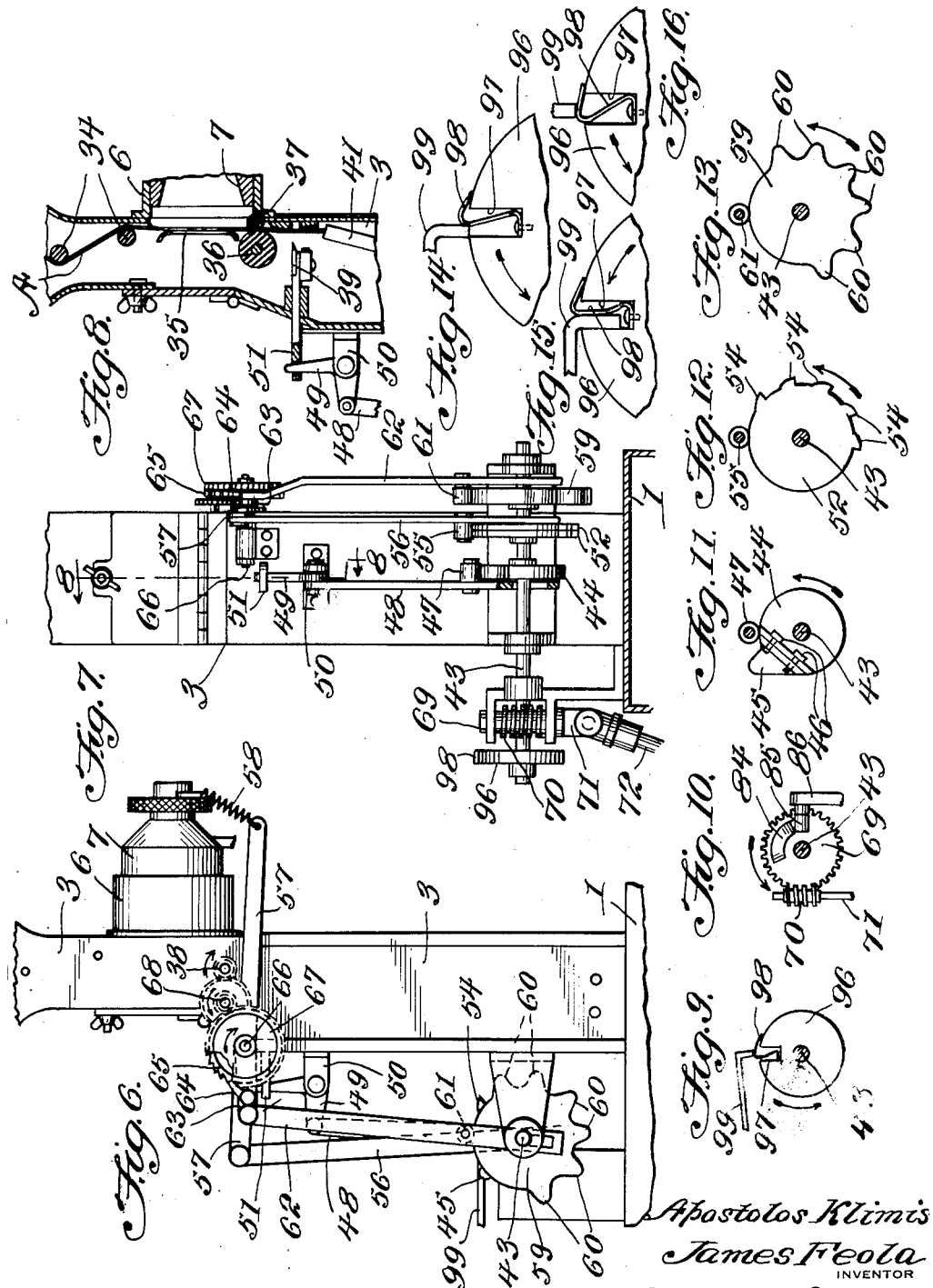

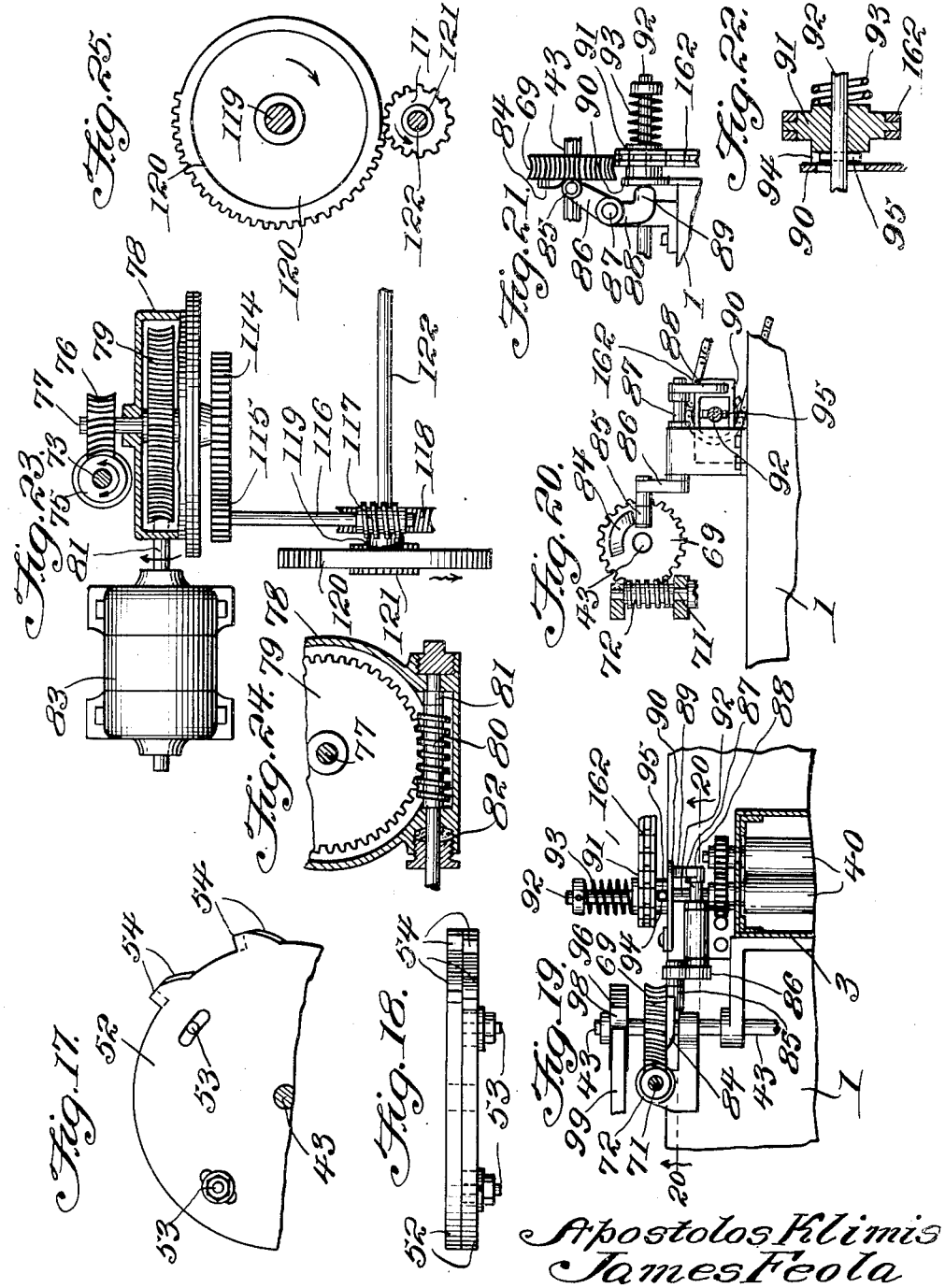

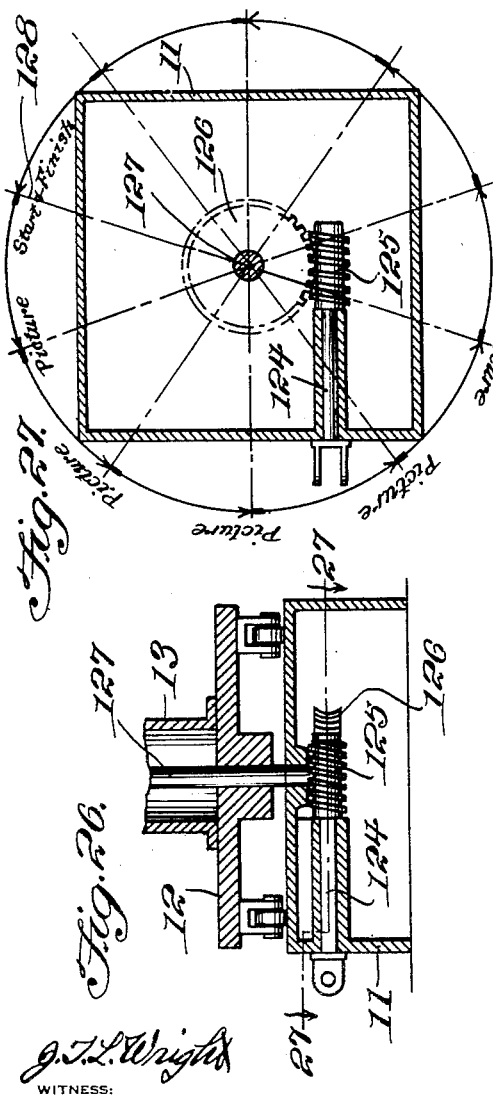

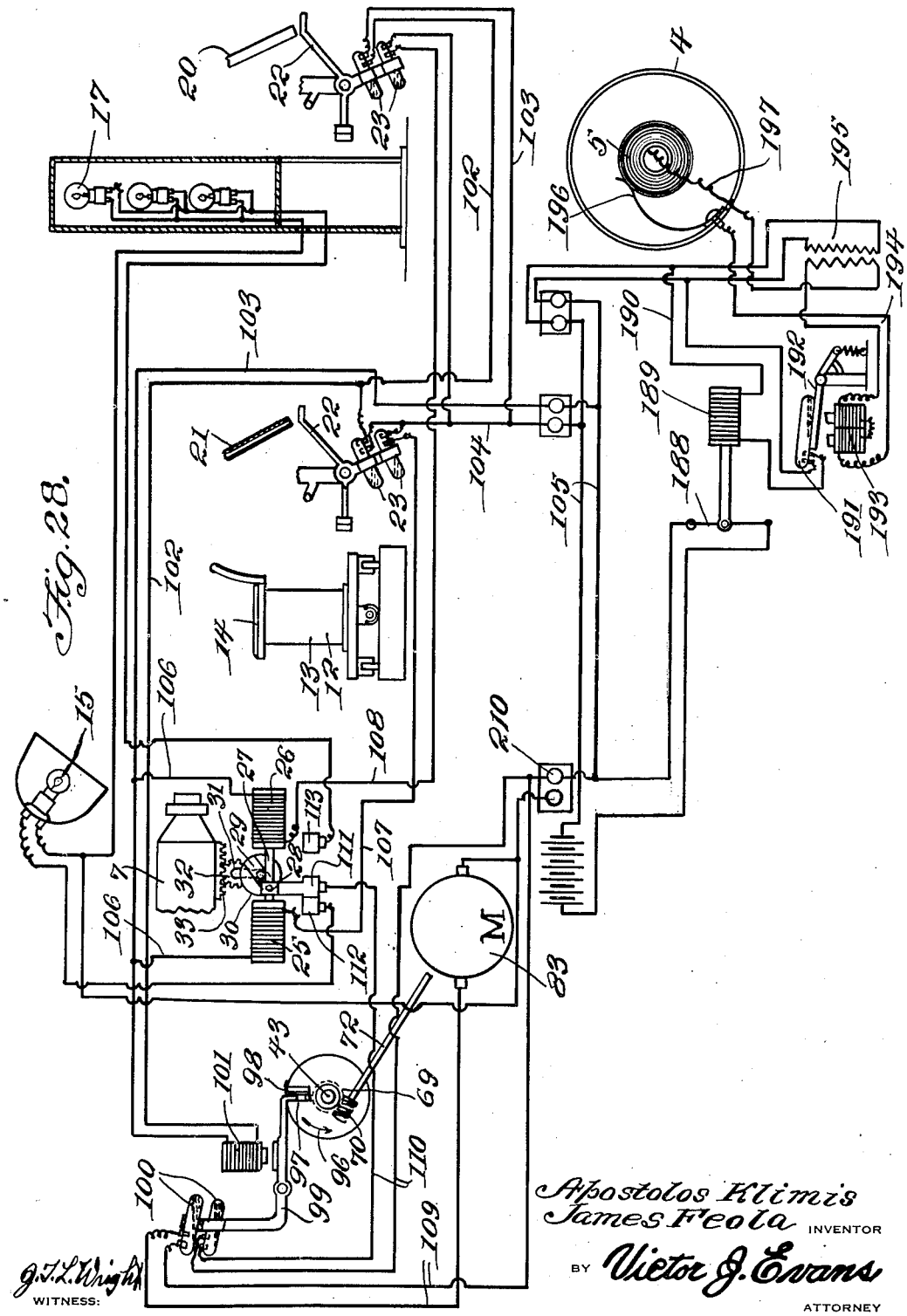

Patented June 27, 1933

1,915,791

UNITED STATES PATENT OFFICE

APOSTOLOS KLIMIS AND JAMES FEOLA, OF BALTIMORE, MARYLAND, ASSIGNORS TO THE AUTOPHOTOGRAPHIC MACHINE COMPANY, INCORPORATED, OF BALTIMORE, MARYLAND, A CORPORATION OF MARYLAND

AUTOMATIC PHOTOGRAPHIC APPARATUS

Application filed April 20, 1929. Serial No. 356,743.

This invention relates to a photographic apparatus which is designed to take a series of photographs on a strip of sensitized material, and the general object of the invention is to provide means for operating the shutter of the camera a certain number of times, to provide means for moving a new portion of the strip in exposing position after each operation of the shutter and to provide means for severing that portion of the strip containing the exposures from the rest of the strip, with a single motor for operating the before mentioned means.

A further object of the invention is to provide a turntable on which the person having his photographs taken sits, with means for turning the table a partial revolution after each exposure, whereby photographs of the sitter are taken with the sitter in different positions, with means for operating the table from the before mentioned motor.

Another object of the invention is to provide means whereby a person can stand in having his pictures taken or sit on a seat on the platform, according to whether he wishes a full length picture or a bust picture taken, with coin operated means arranged adjacent the point where the person stands and similar means arranged adjacent the platform for starting up the motor, when a coin is dropped into either coin chute, with means associated with each coin operated means for focussing the camera and for closing the circuits of lamps which illuminate the person having his pictures taken.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a diagrammatic elevation, showing the complete device.

Figure 2 is a diagrammatic plan view of Figure 1.

Figure 3 is an elevation of the photographic apparatus.

Figure 4 is a front veiw of Figure 3.

Figure 5 is a vertical sectional view through the photographic apparatus.

Figure 6 is an enlarged elevation showing the means for operating the shutter, the cutter and the strip feeding means.

Figure 7 is a rear view of Figure 6.

Figure 8 is a section on line 8—8 of Figure 7.

Figure 9 is a view showing the means for permitting but one revolution of the shaft which operates the shutter, the feeding means and the knife.

Figure 10 is a view of the worm on said shaft which imparts movement to the shaft from the motor, with the cam on the shaft for controlling the means which stop the operation of the means which feed the exposed strip into the tank.

Figure 11 is a view of the cam for operating the knife.

Figure 12 is a view of the toothed wheel for operating the shutter.

Figure 13 is a view of the toothed wheel for operating the feeding means which feed the strip through the camera.

Figures 14, 15 and 16 are fragmentary views of the disk shown in Figure 9, and showing how the same operates the motor switch lever.

Figure 17 is a fragmentary view of the shutter operating disk and showing the means for adjusting the cams thereon to take up wear.

Figure 18 is an edge view of Figure 17.

Figure 19 is a fragmentary view showing the feed rollers for feeding the strip containing the exposures into a tank, this view also showing the clutch means for said rollers and the means for moving the clutch means into inoperative position.

Figure 20 is a section on line 20—20 of Figure 19.

Figure 21 is a fragmentary view of the clutch and the operating means therefor.

Figure 22 is a sectional detail view of the clutch means.

Figure 23 is a plan view, with parts in section, showing the motor driven gearing for driving the shaft for operating the shutter, the strip feeding means, the severing means and the shaft which turns the turntable.

Figure 24 is a sectional detail view showing the means for driving the large gear from the motor shaft.

Figure 25 is a view of the mutilated gear and the pinion with which it meshes for operating the turntable step by step.

Figure 26 is a view of the means for rotating the turntable.

Figure 27 is a plan view of Figure 26, this view being partly diagrammatic to show the step by step movements of the table.

Figure 28 is a diagrammatic view of the circuits.

In these views, the numeral 1 indicates a casing supported by the legs 2, and the numeral 3 indicates a narrow vertical casing supported at its lower end on the top of the casing 1 and having a housing 4 at its upper end which contains a reel 5 for a strip of sensitized material, access to the housing being had through a hinged door 4'. The front of the casing 3 carries a slidable support 6 for a camera 7, and the casing 1, its legs 2 and the casing 3 with the housing 4 are enclosed in a casing or housing 8 provided with suitable doors 9 so that access can be had to the interior parts, the front of the casing 8 having an opening in its front in alignment with the front of the camera, in which opening is supported the small end of a substantially conical member 10 through which the light rays enter the camera and which acts to prevent objectionable rays of light from reaching the lens of the camera.

A base 11 is arranged in front of the casing 8 and contains a track for a turntable 12 which supports a pedestal 13 which in turn supports a seat 14 for the person whose photograph is to be taken. Lamps 15 are arranged in an overhanging part 16 at the top of the front of the housing 8 for illuminating the person occupying the seat 14, and two sets of lamps 17, with reflecting means 18 for each set, are supported on the uprights 19 a certain distance in front of the seat supporting means and a certain distance from the sides of said supporting means, as shown in Figures 1 and 2. These lamps 17 are designed to illuminate a person standing adjacent a coin chute 20. A similar coin chute 21 is arranged adjacent the seat supporting means.

Each coin chute includes a weighted lever 22 so arranged that a coin passing down the chute will strike one end of the lever and thus overbalance the weight so that the lever will tilt downwardly and thus close the two mercury switches 23 attached to an arm of each lever. The coin then drops from the lever into a coin tray contained in an enlarged part 24 at the bottom of the chute.

The camera is focussed on a person occupying the seat or on a person standing near the chute 20 through means of the magnets 25 and 26, the cores of which are connected together by a bar 27 and a link 28 connects the bar with a block 29 slidably arranged in a groove in a disk 30 fastened to the outer end of a shaft 31 suitably journaled in a part of the device and having a gear 32 on its inner end which engages a rack bar 33 attached to the under side of the camera at the front thereof so that when either one of the magnets is energized, the camera will be properly focussed on the person occupying the seat or on the person standing, according to which magnet is energized.

The sensitized strip A passes downwardly from the reel over the guiding rolls 34 in the casing 3 through the guiding means 35 at the rear of the camera, which holds that portion at the rear of the camera in exposing position and then the strip passes between the feeding rolls 36 and 37 which are geared together by the gears 38.

A reciprocatory knife 39 is arranged in the casing 3, under the feeding rolls, so as to sever the strip after a certain portion thereof has passed through the camera and another pair of feeding rolls 40 is arranged in the lower end of the casing 3 for feeding the severed portion of the strip into a solution tank. Guiding means 41 are arranged in the casing for guiding the strip from the knife to the rolls 40.

A shaft 43 carries a disk 44 having a single cam 45 thereon which is attached to the disk by the bolts 46 so that by removing the bolts and placing one or more shims between the cam and the disk, the cam can be adjusted to take up wear. This disk and its cam are engaged by a roll 47 carried by a rod 48, the lower part of which is slotted to receive the shaft 43 and its upper end is pivoted to one arm of a bell crank 49 pivoted to a bracket 50 attached to a part of the casing 3, the other arm of the bell crank engaging the shank 51 of the knife 39. Thus for every revolution of the disk 44, the cam 45, engaging the roll 47, will lift the rod 48 and thus cause the bell crank to move the knife and its shank inwardly so that the knife will sever the strip below the feeding rolls 36 and 37.

The shaft 43 also carries a pair of disks 52 adjustably connected together by the pin and slot connections 53 and each disk carries five cams 54. Each cam on one disk is placed opposite a cam on the other disk, but when the cams wear by moving one disk in relation to the other, the cams on one disk can be made to project beyond the cams on the other disk and thus compensate for wear. These cams engage a roll 55 carried by a rod 56 similar to the rod 48 and pivotally connected at its upper end to a lever 57, the front end of said lever being connected to the shutter operating means of the camera by a spring 58. Thus during one revolution of the disk 52, the shutter of the camera will be operated five times.

A disk 59 is also attached to the shaft 43 and carries the six cams 60 which engage a roll 61 on a rod 62 which is similar to the rods 48 and 56, and the upper end of which is pivoted to a short lever 63 which carries a gear 67 which meshes with a pinion 68 fastened to a short shaft 66 which also carries a gear 67 which meshes with a pinion 68 fastened to the trunnion of the feed roll 36. Thus the feed rolls 36 and 37, which are geared together, are moved a distance to bring a new portion of the strip in exposing position at the rear of the camera every time the rod 62 is raised by a cam 60 on the disk 59, through the ratchet means 64 and 65 and the gears 67 and 68.

These parts are so arranged that a cam on the disk 52 will first operate the shutter of the camera, it being understood that an unexposed portion of the strip is at the rear of the camera, then a cam on the disk 59 will operate the feed rolls 36 and 37 to bring a new portion of the strip in rear of the camera, then another cam on disk 52 will operate the shutter operating mechanism to expose this portion. Then another cam on the disk 59 will operate the feeding means to bring another portion of the strip into exposing position and this action will continue until five exposures have been made on the strip. Then the cam 45 on disk 44 will operate the knife to sever the strip at the center of an unexposed portion of the strip which has been brought below the feed rolls by the last cam on the disk 59 so that the upper end of the severed strip contains half of an unexposed section and the lower end of the strip, which is attached to the reel and which is located below the feed rolls, also contains a half of an unexposed section, the action ceasing with an unexposed portion of the strip at the rear of the camera. Of course, the disk may carry as many cams as it is desired to take pictures on a length of the sensitized medium before the same is severed by the knife.

The shaft 43 also carries a gear 69 which meshes with a worm 70 on a stub shaft 71 suitably journaled in the device and one end of this shaft 71 is connected by a universal joint with a shaft 72, the other end of which is connected to a stub shaft 73 supported in a bracket 74 arranged under the casing 1 and carrying a worm 75 which meshes with a worm gear 76 fastened to a shaft 77 journaled in a gear housing 78 and a worm gear 79 is fastened to the shaft 77 and is located in the housing 78. This gear 79 meshes with a worm 80 on a shaft 81 passing through packing glands 82 in the bottom of the housing and driven from a motor 83. Thus the motor operates the shaft 43 through the connections described.

The gear 69 carries a cam 84 on one face thereof, which engages a roll 85 on the crank 86 of a shaft 87 suitably journaled in the device and having a crank 88 at its other end, which is formed with a projection 89 for pressing a spring plate 90 against a sprocket 91 slidably arranged on the shaft 92 of one of the feed rolls 40, so as to move this gear against the action of a spring 93 and free the slotted part 94 of the gear from a pin 95 passing through the shaft 92, thus permitting the sprocket 91 to rotate on the shaft without driving the feed rolls 40. This stopping action of the feed rolls 40 will take place just before the knife severs the strip after the last picture has been taken.

The shaft 43 also carries a disk 96 which is formed with a single notch 97 in its periphery. A light spring 98 of substantially Z-shape is arranged in the notch, with its upper end normally closing the notch. A switch lever 99, pivoted to a part of the device, has an upwardly extending part at one end which carries the mercury switches 100 and its other end is bent downwardly and engages the periphery of the disk 96. During the rotation of the disk, the bent end of the lever rides on the periphery thereof until said bent end engages the outer part of the spring 98 and then, on further rotation of the disk, the bent end forces the spring rearwardly and then the bent end enters the notch. As soon as the lever is lifted, the bent end will leave the notch and thus permit the spring to assume its normal position with its upper end closing the notch so that when the lever drops, its bent end will engage the lever and thus be prevented from entering the notch so that the disk can make a complete revolution with the lever in raised position and then the lever pushes the spring aside and enters the notch, as before described.

A magnet 101 is so arranged that when energized, it will lift the lever 99 to pull the bent end thereof out of the notch so that the disk can make a complete revolution before the lever drops. One of the wires 102 of said magnet is connected to a contact in each of the upper switches 23 of the coin controlled levers 22 of the chutes 20 and 21. The other wire 103 of the magnet 101 and the wires 104 which are connected with the other contacts of the upper switches 23 are connected with the supply wires 105. These wires 102 and 103 are also connected by the wires 106 with the magnets 25 and 26 and the magnet 25 is connected by the wire 107 with the lower switch 23 of the lever of chute 21 and the magnet 26 is connected by the wire 108 with the lower switch of the lever of chute 20. Thus when a coin is dropped into either chute, the lowering of the coin lever 22 will close the switches 23 so that current will be supplied to the magnet 101 to raise the lever 99 so that the motor can rotate the shaft 43 one complete revolution and then the lever 99 will drop into the notch and stop further rotation of the shaft 43. As will be seen, the magnet 101 is only energized for a short time as the disk 96 will hold the lever 99 raised without the magnet being energized. The magnet is simply energized during the time the lever 22 is tilted by the coin and as soon as this tilting movement takes place, the coin drops therefrom so that the weight returns the lever and its switches to raised position and thus breaks the circuit. As the lever 22 of chute 21 is tilted, the lower switch 23 closes the circuit to the magnet 25 so that the camera is focussed on a person sitting in the seat and when the lever of chute 20 is tilted, the lower switch of this lever closes the circuit of the magnet 26 and thus focusses the camera on a person standing near the chute 20.

The upper switch 100 on the lever 99 closes the circuit 109 to the motor 83 when the lever is raised so that the motor will operate the shaft 43 and the lower switch 100 will close the circuit 110 to the lamps 15 or 17 according to the position of the contact 111 which is moved by the bar 27 which connects the magnets 25 and 26 together. This contact will engage a contact 112 when the magnet 25 is energized and thus supply current to the lamps 15, and when the magnet 26 is energized, the contact 111 will engage the contact 113 and thus supply current to the lamps 17.

The shaft 77 has attached thereto a gear 114 which meshes with a pinion 115 attached to a shaft 116 and this shaft carries a worm 117 meshing with a worm gear 118 on a stub shaft 119 to which is attached a mutilated gear 120 having teeth on but a part of its periphery, these teeth engaging a pinion 121 on a shaft 122 which is connected by a universal joint to a shaft 123 which is connected by another universal joint to a shaft 124 journaled in the base 11 and having a worm 125 thereon which meshes with a worm gear 126 on a vertical shaft 127 which is attached to the turntable so that said turntable is rotated from the motor 83. The teeth on the gear 120 are so arranged that they will operate the turntable step by step with a pause between each step and it is during this pause that the shutter of the camera is operated to take the picture. As shown diagrammatically in Figure 27, the pictures are only taken when the sitter is in positions to take a profile, partly profile and full face picture, the profiles being right and left, though the turntable continues to rotate even though the pictures are not being taken until it reaches the starting and finishing point 128.

A switch 188 is arranged in the main circuits and is opened by a magnet 189 when the same is energized. The circuit 190 of this magnet 189 is controlled by a mercury switch 191 arranged on a spring controlled lever 192 and this lever is moved to switch closing position by the magnets 193, the circuit 194 of which contains a transformer 195 so that but a small amount of current will pass to the magnets 193 when the circuit is closed. This circuit 194 is closed when the strip has left the reel 5 through means of a spring contact 196 which engages a part of the strip when the strip is on the reel, but as soon as the strip leaves the reel, the contact will engage a part of the reel which is electrically connected with the circuit, as shown at 197, so that the circuits to the magnets 193 will be closed whereby said magnets will move the switch 191 to closing position so as to close the circuit of the magnet 189 and thus cause the same to open the switch 188, which will break the main circuit and thus stop operation of the entire apparatus until a new strip has been placed on the reel.

The operation of the device is as follows:—

Starting with the table at the starting point 128 in Figure 27, with enough strip drawn from the reel to pass through the camera and be seized by the feed rolls 36 and 37, a person occupying the seat would drop a coin into the chute 21, if he wishes a half length picture taken of himself, and said coin will lower the lever 22 so as to move the switches 23 into closing position. The closing of the circuits by these switches will cause the magnet 101 to lift the lever 99 so that the circuit of the motor 83 will be closed and at the same time, the magnet 25 will be energized to focus the camera on the person occupying the seat and the circuit to the lamps 15 will be closed to illuminate said person. Thus the motor will start to rotate the shaft 43 and cause the disk 96 to hold the lever 99 in switch closing position so that when the coin drops from the lever 22 and the same returns to normal position, the deenergizing of the magnet 101 will not cause the lever 99 to drop. The operation of the motor will move the table one-tenth of a revolution and then the table will stop at the first picture taking position, shown in Figure 27. Then the cam on the double disk 52 will operate the shutter to make an exposure after which a cam 60 on the disk 59 will operate the feeding rolls 36 and 37 to bring a new section of the strip in rear of the camera and at the same time, the table will move to the second picture taking position of Figure 27. Then the shutter will be operated by the next cam on the disk 52 to make a second exposure, after which the second cam on the disk 59 will operate the feeding means to bring another section of the strip in rear of the camera and the table will be moved to the third picture taking position. This action is kept up until five pictures have been taken and then the cam 49 on the disk 44 will actuate the cutting means to sever that part of the strip containing the five exposures from the rest of the strip. Then the notch in disk 96 will come under the bent end of the lever 99 so that the same will drop into the notch, thus breaking the circuits to the motor and lamps so that the apparatus will cease operation, though this will not occur until the table has reached the starting and finishing point 128.

If a person wishes a full length picture taken, he would stand near the chute 20 so that the coin would operate the lever 22 adjacent the chute 20 and the same operation as before described would take place, excepting that the magnet 26 would be energized to focus the camera on the person standing near the chute 20 and this focussing action would cause the contact 111 to engage the contact 113 and thus supply current to the lamps 17 to illuminate the person. If the person occupies the seat, the photographs will be left and right profiles and full face, but if the person stands near the chute 20, he must turn himself to secure the profile and full face pictures. Of course, the person either standing or occupying the seat can change his expressions for each photograph, if he desires.

We prefer to place fuses 210 at the points where the various circuits join the main circuit.

It is thought from the foregoing description that the advantages and novel features of the invention will be readily apparent.

It is to be understood that changes may be made in the construction and in the combination and arrangement of the several parts, provided that such changes fall within the scope of the appended claims.

What we claim is:—

1. A photographic machine comprising a camera, rolls for feeding a sensitized strip through the camera, a shutter operating lever, a knife for severing the strip below the feed rolls, a shaft, a motor for driving the same, a disk on the shaft having cams thereon, means operated by the cams for actuating the shutter operating lever, a second disk on the shaft having cams thereon, means operated by the cams for actuating the feeding rolls, the cams on the first disk operating the shutter actuating lever alternately with the operation of the feed rolls by the cams of the second disk, a third disk on the shaft, a single cam thereon, means operated by said cam for actuating the knife after the cams on the other disks have passed through their respective operating means, a circuit for the motor and means for breaking the circuit after the shaft has made a complete revolution.

2. A photographic machine comprising a camera, rolls for feeding a sensitized strip through the camera, a shutter operating lever, a knife for severing the strip below the feed rolls, a shaft, a motor for driving the same, a disk on the shaft having cams thereon, means operated by the cams for actuating the shutter operating lever, a second disk on the shaft having cams thereon, means operated by the cams for actuating the feeding rolls, the cams on the first disk operating the shutter actuating lever alternately with the operation of the feed rolls by the cams of the second disk, a third disk on the shaft, a single cam thereon, means operated by said cam for actuating the knife after the cams on the other disks have passed through their respective operating means, a circuit for the motor, a notched disk on the shaft, a lever having a bent end engaging the periphery of the disk and dropping into the notch when the same comes opposite the bent end, a circuit for the motor, a switch on the lever which is moved to open position when the bent end drops into the notch and means for moving the lever to free its bent end of the notch and closing the switch whereby the shaft will make a complete revolution, after which the circuit of the motor is broken by the bent end of the lever dropping into the notch.

3. A photographic machine comprising a camera, rolls for feeding a sensitized strip through the camera, a shutter operating lever, a knife for severing the strip below the feed rolls, a shaft, a motor for driving the same, a disk on the shaft having cams thereon, means operated by the cams for actuating the shutter operating lever, a second disk on the shaft having cams thereon, means operated by the cams for actuating the feeding rolls, the cams on the first disk operating the shutter actuating lever alternately with the operation of the feed rolls by the cams of the second disk, a third disk on the shaft, a single cam thereon, means operated by said cam for actuating the knife after the cams on the other disks have passed through their respective operating means, a circuit for the motor, a notched disk on the shaft, a lever having a bent end engaging the periphery of the disk and dropping into the notch when the same comes opposite the bent end, a circuit for the motor, a switch on the lever which is moved to open position when the bent end drops into the notch, means for moving the lever to free its bent end of the notch and closing the switch whereby the shaft will make a complete revolution, after which the circuit of the motor is broken by the bent end of the lever dropping into the notch and a spring in the notch for preventing the bent end of the lever entering the same when the same is lifted and then released.

4. A photographic machine comprising a camera, rolls for feeding a sensitized strip through the camera, a shutter operating lever, a knife for severing the strip below the feed rolls, a shaft, a motor for driving the same, a disk on the shaft having cams thereon, means operated by the cams for actuating the shutter operating lever, a second disk on the shaft having cams thereon, means operated by the cams for actuating the feeding rolls, the cams on the first disk operating the shutter actuating lever alternately with the operation of the feed rolls by the cams of the second disk, a third disk on the shaft, a single cam thereon, means operated by said cam for actuating the knife after the cams on the other disks have passed through their respective operating means, a circuit for the motor, a notched disk on the shaft, a lever having a bent end engaging the periphery of the disk and dropping into the notch when the same comes opposite the bent end, a circuit for the motor, a switch on the lever which is moved to open position when the bent end drops into the notch, means for moving the lever to free its bent end of the notch and closing the switch whereby the shaft will make a complete revolution, after which the circuit of the motor is broken by the bent end of the lever dropping into the notch, a rotary seat in front of the camera, means for operating the same step by step from the motor, lamps for illuminating the seat, other lamps for illuminating a person standing in front of the camera, circuits for each set of lamps, camera focussing means, means associated therewith for closing the circuit of either set of lamps, means arranged adjacent the seat and adjacent the position of the standing person for actuating the lever lifting means and the camera focussing means.

5. A photographic apparatus comprising a camera, feeding means for feeding a sensitized strip step by step through the camera, a shutter for the camera, means for actuating the shutter alternately with the feeding means, severing means for severing the strip below the feeding means, a motor for actuating the before mentioned means, a circuit for the motor, a switch in said circuit, a lever carrying the switch, a magnet for raising the lever to close the circuit, a circuit for the magnet, a pair of switch carrying members, the switches of which control the circuit for the magnet, a rotary seat, means for rotating the seat from the motor in a step by step manner and while the shutter is closed, said seat being arranged adjacent one of said members, whereby said member can be operated by a person occupying the seat to close the circuit of the magnet, the other member being arranged adjacent a point where a person stands to have the camera take a full length view, whereby said person can actuate the second member to close the circuit of the magnet, means operated by the motor for holding the lever in switch closing position after the lever has been raised by the magnet, such means permitting the lever to move to switch opening position after the motor has operated the feeding means and shutter means a certain number of times and the severing means has been operated to sever the strip containing the exposures.

6. A photographic apparatus comprising a camera, feeding means for feeding a sensitized strip step by step through the camera, a shutter for the camera, means for actuating the shutter alternately with the feeding means, severing means for severing the strip below the feeding means, a motor for actuating the before mentioned means, a circuit for the motor, a switch in said circuit, a lever carrying the switch, a magnet for raising the lever to close the circuit, a circuit for the magnet, a pair of switch carrying members, the switches of which control the circuit for the magnet, a rotary seat, means for rotating the seat from the motor in a step by step manner and while the shutter is closed, said seat being arranged adjacent one of said members, whereby said member can be operated by a person occupying the seat to close the circuit of the magnet, the other member being arranged adjacent a point where a person stands to have the camera take a full length view, whereby said person can actuate the second member to close the circuit of the magnet, means operated by the motor for holding the lever in switch closing position after the lever has been raised by the magnet, such means permitting the lever to move to switch opening position after the motor has operated the feeding means and shutter means a certain number of times and the severing means has been operated to sever the strip containing the exposures, means for focussing the camera on either the person occupying the chair or the person standing, lamps for illuminating the person occupying the chair or the person standing, circuits for the lamps and the camera focussing means and means for closing said circuits by the switch carrying members.

In testimony whereof we affix our signatures.

APOSTOLOS KLIMIS.
JAMES FEOLA.